United States Patent
Zhang et al.

(10) Patent No.: US 12,500,420 B2
(45) Date of Patent: Dec. 16, 2025

(54) METHOD TO OPERATE A SYSTEM COMPRISING AN ENERGY STORAGE SYSTEM IN RESPONSE TO A BYPASS REQUEST BASED ON A TOTAL NUMBER OF MODULES TO BE BYPASSED

(71) Applicant: Hitachi Energy Ltd, Zürich (CH)

(72) Inventors: Hongyang Zhang, Stockholm (SE); Haofeng Bai, Västerås (SE); Mikael Tenerz, Västerås (SE); Filiph Appelgren, Västerås (SE); Theodore Soong, Toronto (CA)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 19/066,603

(22) Filed: Feb. 28, 2025

(65) Prior Publication Data

US 2025/0279651 A1    Sep. 4, 2025

(30) Foreign Application Priority Data

Feb. 29, 2024  (EP) ..................... 24160581

(51) Int. Cl.
*H02J 3/28*       (2006.01)
*H02J 3/00*       (2006.01)
*H02M 7/483*      (2007.01)

(52) U.S. Cl.
CPC .............. *H02J 3/28* (2013.01); *H02J 3/0012* (2020.01); *H02M 7/483* (2013.01)

(58) Field of Classification Search
CPC .................................................... H02J 3/0012
See application file for complete search history.

(56) References Cited

U.S. PATENT DOCUMENTS

| | | | | |
|---|---|---|---|---|
| 2021/0280929 A1* | 9/2021 | Perez | ................... | H01M 50/213 |
| 2023/0261331 A1* | 8/2023 | Morton | ............... | H01M 50/271 |
| | | | | 429/163 |

(Continued)

FOREIGN PATENT DOCUMENTS

| | | |
|---|---|---|
| CN | 114188967 A | 3/2022 |
| WO | 2019/145044 A1 | 8/2019 |

OTHER PUBLICATIONS

Priolli de Araujo, Andre, SVC Plus FS: Grid Supporting STATCOM, Siemens Energy Transmission Solutions, Flexible AC Transmission Systems Aug. 12, 2020.

(Continued)

*Primary Examiner* — Nathan L Laughlin
(74) *Attorney, Agent, or Firm* — PROCOPIO, CORY, HARGREAVES & SAVITCH LLP (57) ABSTRACT

There is disclosed herein a method to operate a system comprising an energy storage system (ESS) and a converter. The ESS being connected to the converter such that a DC-side of the converter forms DC terminals between which at least one string of modules of the ESS is connected. The method comprises receiving a bypass request to bypass at least one module in the ESS, based on a total number of modules to be bypassed exceeding a number of redundant modules, controlling the converter to reduce the terminal voltage of the ESS; and after reducing the terminal voltage of the ESS, bypassing the module. There is further disclosed herein a system comprising a central controller performing said method.

14 Claims, 4 Drawing Sheets

(56) References Cited

U.S. PATENT DOCUMENTS

| | | | |
|---|---|---|---|
| 2023/0296004 A1* | 9/2023 | Cooley | H01G 11/62 |
| | | | 320/130 |
| 2023/0344257 A1 | 10/2023 | Davidson | |
| 2024/0047978 A1* | 2/2024 | Syouda | H02J 7/0016 |
| 2024/0322707 A1* | 9/2024 | Osakue | H02J 7/0013 |

OTHER PUBLICATIONS

Yang, Bo et al., "Redundancy Strategy of Cascaded Energy Storage System Based on Model Prediction Control", ICCEE-2022, Journal of Physics: Conference Series, Institute of Physics Publishing, GB, vol. 2320, No. 1, Aug. 1, 2022 (Aug. 1, 2022), 11 pages.

Mathew, Ebin Cherian et al., "Modulation, Control and Capacitor Voltage Balancing of Alternate Arm Modular Multilevel Converter With DC Fault Blocking Capability", 2014 IEEE Applied Power Electronics Conference and Exposition—APEC 2014, IEEE, Mar. 16, 2014 (Mar. 16, 2014), pp. 3329-3336.

Farias, João Victor Matos et al., "On Converter Fault Tolerance in MMC-HVDC Systems: A Comprehensive Survey", IEEE Journal of Emerging and Selected Topics in Power Electronics, vol. 9, No. 6, Dec. 2021, pp. 7459-7470.

Trigo, Jose Salazar, "SVC Plus FS Estabilización Dinámica de la Red", date unknown, 51 pages.

Kynev, Sergey, "Grid Forming STATCOM with Supercapacitors", 2023 IEEE PES General Meeting, Jul. 16, 2023, 21 pages.

Extended European Search Report issued in EP24160581.5, dated Sep. 12, 2024, 7 pages.

\* cited by examiner

METHOD TO OPERATE A SYSTEM COMPRISING AN ENERGY STORAGE SYSTEM IN RESPONSE TO A BYPASS REQUEST BASED ON A TOTAL NUMBER OF MODULES TO BE BYPASSED

CROSS-REFERENCE TO RELATED APPLICATIONS

The present application claims priority to European Patent Application No. 24160581.5, filed on Feb. 29, 2024, which is hereby incorporated herein by reference as if set forth in full.

TECHNICAL FIELD

The present disclosure relates to power grid systems having energy storage support. More particularly, the present disclosure relates to a method to operate a power grid-connectable energy storage system and a system comprising a controller configured to carry out the method.

BACKGROUND

Energy storage systems (ESSs) are systems for storing electrical energy in bulk. The electrical energy may have been generated by intermittent generating means and, thus, ESSs conveniently provide a way to store generated electrical energy for later use, as desired, even if the generating means themselves are offline. As such, ESSs may form an important part of a renewable energy distribution grid comprising, for example, solar or wind generation.

ESSs can be integrated with converters to form enhanced power grid systems. An example of such a system is an enhanced static synchronous compensator (E-STATCOM), which integrates a full-bridge-based, or a combination of full-bridge and half-bridge-based, modular multilevel converter (MMC) with for example a supercapacitor-based energy storage system (ESS). In such systems, an energy storage management system (ESMS) is conventionally used to regulate the amount of energy stored within the ESS, which may also be referred to as its state of charge (SoC).

The E-STATCOM is capable of supplying active and/or reactive power to a power grid. However, the ESS contains a limited amount of electrical energy, and thus it is conventional for such a system, and in particular an ESMS therein, to track the SoC of the ESS and to operate it accordingly, i.e., to regulate a power transfer between the ESS and the power grid.

There is a desire to provide improved methods for managing an ESS, as such improvements may lead to a slower degeneration of the components of the ESS and thus increase the operational lifetime and reduced cost of the ESS, and accordingly any E-STATCOM system in which the ESS is installed.

SUMMARY

It is therefore an object of the present disclosure to provide a method for operating a power grid-connectable energy storage system, ESS, and a system performing said method that alleviates at least part of the above-mentioned drawbacks. It is for example an object of the present disclosure to provide a method that provides longer operational lifetime of the ESS and reduces the cost of the ESS.

According to a first aspect of the present disclosure, a method to operate a system comprising an energy storage system (ESS) and a converter is provided. The ESS is connected to the converter such that a DC-side of the converter forms DC terminals between which at least one string of modules of the ESS is connected. In this way, the converter can transfer power between a power grid and the ESS. Each module may comprise, for example, one or more capacitors or supercapacitors.

The method comprises receiving a bypass request to bypass at least one module in the ESS. The bypass request may be sent from a local controller that is responsible for a particular protection zone of the ESS. Each protection zone may comprise one or more modules and bypass circuitry such that, if one of the one or more modules fails, the bypass circuitry can enact a bypassing of the one or more modules. Protection zones comprising a plurality of modules simplifies design and reduces the number of components required in the ESS, while protection zones formed with one module each allow for greater flexibility.

Based on a total number of modules to be bypassed $N1$ exceeding a number of redundant modules $N2$, the converter is controlled to reduce the terminal voltage of the ESS and, after reducing the terminal voltage of the ESS, the module is bypassed.

The control of the DC-side of the converter may be enacted by a control system that controls the ESS and the converter or communicates with controllers of each of the ESS and the converter, depending on the implementation.

The reduction of the terminal voltage of the ESS may be determined by controlling converter limits, such as a power limit, an energy limit, and/or a lifetime setpoint. The converter may enact the reduction of the terminal voltage in any manner understood by those in the art, such as by modifying a modulation scheme.

According to a second aspect of the present disclosure a system is provided. The system comprises a converter having a first and a second DC terminal, forming a DC-side of the converter and an energy storage system, ESS, having at least one string of modules connected between the first and second DC terminal. The system further comprises a central controller configured to control the system according to the first aspect.

Energy storage systems are conventionally designed with redundant modules and with bypass circuits for bypassing faulty modules. When one operating module becomes faulty this module is bypassed and one of the redundant modules is activated. This allows the energy storage system to keep operating with the full capability of the energy storage system. However, this results in an increased cost where the redundancy of the ESS is entirely dependent on the number of redundant modules. When the last redundant module is used and a new fault occurs, the entire energy storage system may be taken out of operation, i.e., tripped. Thereafter, the energy storage system is not able to provide grid support to the power grid until it is brought back online (e.g., via maintenance or replacement of failed modules). If the ESS is not tripped, the remaining modules may be at risk of operating beyond their rating(s) and hence the risks of faults, such as overvoltage faults, increases.

It is realized as a part of the present disclosure that, by reducing the terminal voltage of the ESS, the ESS can continue operating even if all of the installed redundant modules have already been bypassed when a further fault occurs in a module. By reducing the terminal voltage of the ESS, the modules can keep operating within their rating(s). This increases the operational lifetime of the ESS. When the terminal voltage of the ESS is lower, the ESS is able to keep providing grid supporting functions to the power grid even if there are no redundant modules to use. By reducing the terminal voltage to a level which is within the rating of the remaining modules, the ESS can keep operating without an increased risk of faults.

Further, the possibility to reduce the terminal voltage allows the ESS to operate beyond the time where a conventional system needs to be tripped. The conventional ESS has a sharp transition between fully functional and entirely unable to provide any grid support. When a fault in a module occurs and there is are no more available redundant modules, the conventional ESS is taken out of operation. According to the techniques of the present disclosure, the ESS will keep operating with a lower capacity, which prolongs the time in operation and also increases the flexibility when maintenance or replacement is necessary.

The method compares the total number of modules to be bypassed $N1$ with the number of redundant modules $N2$ to decide whether the terminal voltage has to be reduced or not. The number of redundant modules $N2$ is the number of modules that was used for redundancy when all modules were healthy at installation. The number of redundant modules $N2$ may be fixed number for each string; typically, 10% of the total number of modules are redundant modules. However, the number of redundant modules is dependent on the system design.

In a system where the terminal voltage is reduced to allow the ESS to keep operating, the necessity of redundant modules may decrease. In conventional systems it is a necessity to have redundant modules to have a back-up. The redundant modules result in increased costs for the ESS, but also have a direct negative effect on the ESS performance. More modules in series results in higher equivalent series resistance and lower capacitance that leads to increased voltage swings. The possibility to reduce the voltage enable the possibility to reduce the number of installed modules. This results in an improved ESS reliability and availability since less ESS modules are installed together with a lower overall ESS cost.

Generally, the string comprises a plurality of series connected modules, each having an energy storage, for example a supercapacitor. A minimum number of these modules may be required to satisfy the requirements on output power and energy in the design. To satisfy the requirements on reliability, redundant modules may be installed. This number may be lower than in a conventional ESS, or may be the same or more in some designs. The redundant modules and the minimum number of modules to satisfy the requirements may together form all the modules in the string, when the system is installed, and all the modules are able to be in service.

During operation, failures may occur in modules and faulty modules will be bypassed, until all the redundant modules have been used. As mentioned above, a failure in one module may result in the bypassing of multiple modules in the protection zone of the faulty module. However, if there are more bypassed modules than redundant modules, the output power and energy may be reduced. The reduction of output power and energy can be done by reducing the terminal voltage of the ESS. When the terminal voltage has been reduced, the method ensures such that the new configuration of the system does not exceed maximum module voltage or operate below minimum module voltage.

The method can be controlled for optimizing the available power, or the available energy or for optimizing lifetime of the ESS. How the terminal voltage is chosen can be determined according to any of these optimizations or a combination thereof.

The converter may be controlled to reduce the terminal voltage until the string of modules has at least one redundant module. That is, until the modules in a string can satisfy the requirements placed on them by the converter control, while having a module spare.

By reducing the terminal voltage such that at least one redundant module is reached, the method may ensure that when the next fault occur, the terminal voltage over the modules will be kept inside the ratings of the modules. This may ensure that the system is not operating at the limit of the module ratings such that the converter needs to react every time a fault occurs in a module.

The converter may be controlled to reduce the terminal voltage by adjusting the modulation scheme, for example.

The converter may connect the ESS to an AC grid or a DC grid, such that the converter is an AC/DC converter or a DC/DC converter. The converter may be a modular multi-level converter, MMC. The MMC configuration of the converter may be used to allow a greater flexibility in how the terminal voltage is reduced.

The total number of modules to be bypassed $N1$ may comprise the sum of the number of bypassed modules when the bypass request is received, and the number of modules requested to be bypassed.

As discussed above, depending on the design of the system, there may be groups of modules that are connected to the same bypass circuitry which results in that more than one module may be bypassed at the same time if a fault occurs in one of the modules in the group of modules. These groups may be referred to as 'protection zones'. The modules are often arranged in groups to a respective bypass circuit due to cost efficiency and simplicity in the design.

Further, there may be a fault which affects more than one module, which results in that more than one bypass circuitry needs to be activated at the same time. Therefore, the total number of modules to be bypassed $N1$ may comprise both the number of already bypassed modules when the bypass request is received, and the number of modules that are requested to be bypassed.

The module may be bypassed based on the total number of modules to be bypassed $N1$ in the string not exceeding a predetermined number of modules $N3$.

When a request is sent to bypass a module, the central controller may determine whether the total number of modules to be bypassed exceeds a predetermined number of modules $N3$. The predetermined number of modules $N3$ may act as a threshold where other operations than bypassing are preferred. This may for example act as a safety threshold stopping the system from bypassing the last module, such that the predetermined number of modules $N3$ is one and if there is only one remaining healthy module in the string, and a fault in this module occurs, other operations than bypassing may be preferred before bypassing the module, for example tripping the entire ESS.

The predetermined number of modules may be a sum of the number of redundant modules and a maximum allowed difference between a number of modules required for normal operation and a predefined number of modules required for operation with reduced terminal voltage. As an example, if there are eight modules in the string and three of these acts as redundant modules, the number of modules required for normal operation may be five. If then the predefined number of modules required for operation with reduced terminal voltage is three, there would be a maximum allowed difference of two and the predetermined number of modules may therefore be the five.

The method may further comprise, based on the total number of modules to be bypassed N1 in the string exceeding the predetermined number of modules N3, tripping the ESS.

If there is a system fault, there will probably be many modules that are requested to be bypassed, and in this case, it may be advantageous to trip the ESS instead of bypassing the modules.

The string may comprise at least one local controller configured to monitor the modules in the string, to send the bypass request to the central controller and to activate a bypass circuit of the module if the request is approved by the central controller.

By monitoring the modules with a local controller, information can quickly be sent to the central controller where a decision if the module should be bypassed or not is taken. This allows the central controller to act as an overlaying controller which is provided with information from a plurality of local controllers and are therefore able to make decision based on a system level instead of a module level/protection zone level. This provides an easy scalability to the system. Further, the bandwidth required is reduced when the system have local controllers performing the monitoring and the central controller only receives information and send operations to the local controllers intermittently.

The ESS may further comprise a plurality of strings of modules connected in parallel to each other, and the control of the converter to reduce the terminal voltage may be based on a string with the lowest number of non-bypassed modules.

Conventionally, the ESS comprises a plurality of strings of modules and in this case the control of the terminal voltage is based on the "weakest" string, i.e., the string with the lowest number of non-bypassed modules. The stress at each module will be highest in the string with the lowest number of non-bypassed modules, i.e., operating modules. Therefore, it may be advantageous to adapt the terminal voltage dependent on the string with the least number of non-bypassed modules. This implements a further control parameter for the central controller, the central controller needs to have an overview of all the strings and which of the strings that have fewest non-bypassed modules.

As the terminal voltage is adapted to the string with lowest number of non-bypassed modules, additional failures in another string will not result in a reduction of output power and energy, i.e., terminal voltage. Only failures in the string with the lowest number of non-bypassed modules or failures may result in a new string being the string with the lowest number of non-bypassed modules result in a reduction of the terminal voltage.

The method may further comprise bypassing one or more modules in another string based on the string with the lowest number of non-bypassed modules having more bypassed modules than said other string.

The string with the lowest number of non-bypassed modules may be used to set the terminal voltage and the other strings will be affected by the same terminal voltage. Therefore, it may be advantageous to adapt the number of non-bypassed modules in the other strings such that the other strings use the same or a similar number of non-bypassed modules as the string with the lowest number of non-bypassed modules. Instead of matching the same number of non-bypassed modules, only one or some modules in the other string(s) may be bypassed to reduce the stress on said string(s) to within a limit. This may enhance the stability of the operation and may optimize the capacity of the ESS. Further, this may for example allow the other strings to have further modules as redundant modules, by using the bypassed 'healthy' modules as redundant modules, and thereby increase the redundancy of these strings.

The modules that are bypassed in each of the other strings may be based on a selection or sorting method. In other words, different parameters correlating to the modules and operation of the ESS may be used when deciding which of the healthy modules that are bypassed in the other strings to match the number of modules in the string with the lowest number of non-bypassed modules. As an example, which module that are bypassed may be based on the state of health, SoH, of the modules to balance the SoH between the modules in one string or based on a determined parameter such as optimizing the available power or energy of the ESS.

Effects and features of the second aspect may be largely analogous to those described above in connection with the first aspect. Embodiments mentioned in relation to the first aspect may be at least largely compatible with the second aspect. It is further noted that the present disclosure relates to all possible combinations of features unless explicitly stated otherwise.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that the present disclosure is not limited to the particular component parts of the module and system described may vary. It is also to be understood that the terminology used herein is for the purpose of describing particular embodiments only, and it is not intended to be limiting.

BRIEF DESCRIPTION OF THE DRAWINGS

The above and other aspects of the present disclosure will now be described in more detail, with reference to the appended figures, wherein.

DETAILED DESCRIPTION

The present disclosure is described in the following by way of a number of illustrative examples. It will be appreciated that these examples are provided for illustration and explanation only and are not intended to be limiting on the scope of the disclosure.

Figure 1:
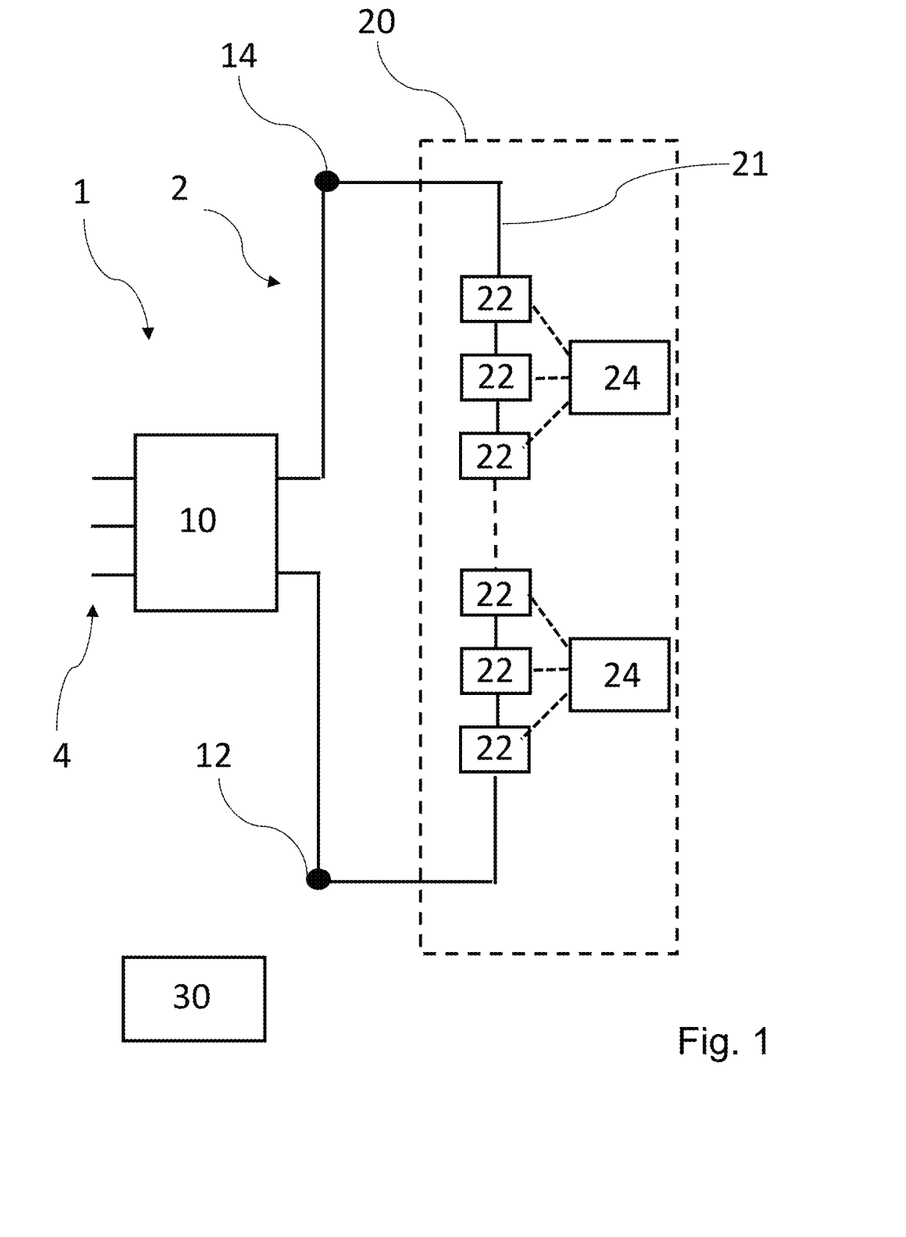
FIG. 1 schematically shows a first exemplifying embodiment of a system.

FIG. 1 discloses an exemplifying embodiment of a system 1 comprising a converter 10, an energy storage system 20 and a central controller 30. The converter 10 comprises an AC side 4 (which may be a connection to, e.g., an AC grid) and a DC-side 2. The DC-side 2 comprises a first and a second DC terminal 12, 14 to which the energy storage system 20 is connected. The energy storage system 20 comprises a string 21 having a plurality of modules 22 that are possible to bypass and the string 21 is connected between the first and second terminal 12, 14 of the DC-side. The string 21 comprises local controllers 24 which are connected to groups of modules 22. In FIG. 1, each local controller 24 is connected to three modules 22. However, this is only an illustrative example, the number of modules 22 that each local controller 24 is connected to is dependent on the specific ESS design. In some cases, there may be one local controller for each module and in other cases each local controller is associated with a different plurality of modules as in FIG. 1.

The local controllers 24 monitor the respective modules and provide information to the central controller 30. The local controllers 24 send a bypass request to the central controller 30 if a fault in any of the monitored modules 22 is detected. The central controller 30 receives the request and, based on the method 100, controls the subsequent operation of the system 1. The method 100 will be further discussed in connection to FIGS. 3 and 4.

Figure 2:
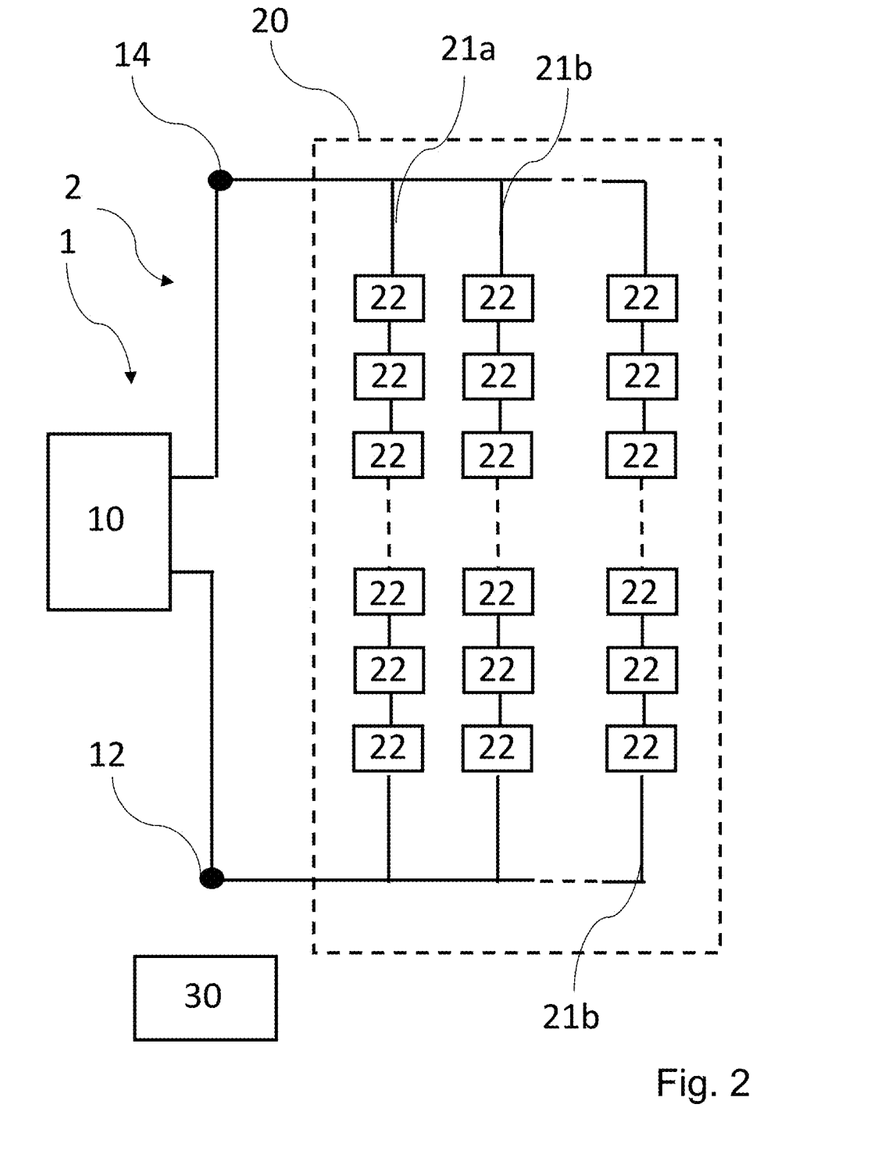
FIG. 2 schematically shows a second exemplifying embodiment of a system.

FIG. 2 schematically shows a second exemplifying embodiment of the system 1. The system 1 may be similar to that shown in FIG. 1 in that, for example, the system 1 comprises a converter 10, an energy storage system 20 and a central controller 30. The ESS 20 is connected at a DC-side 2 of the converter 10 and has a plurality of strings 21a, 21b connected in parallel and between the first DC terminal 12 and the second DC terminal 14. In FIG. 2 each of the strings 21a, 21b comprises a local controller (not shown) for each module 22 that monitors the respective module 22 and provides information and sends bypass requests to the central controller 30.

Figure 3:
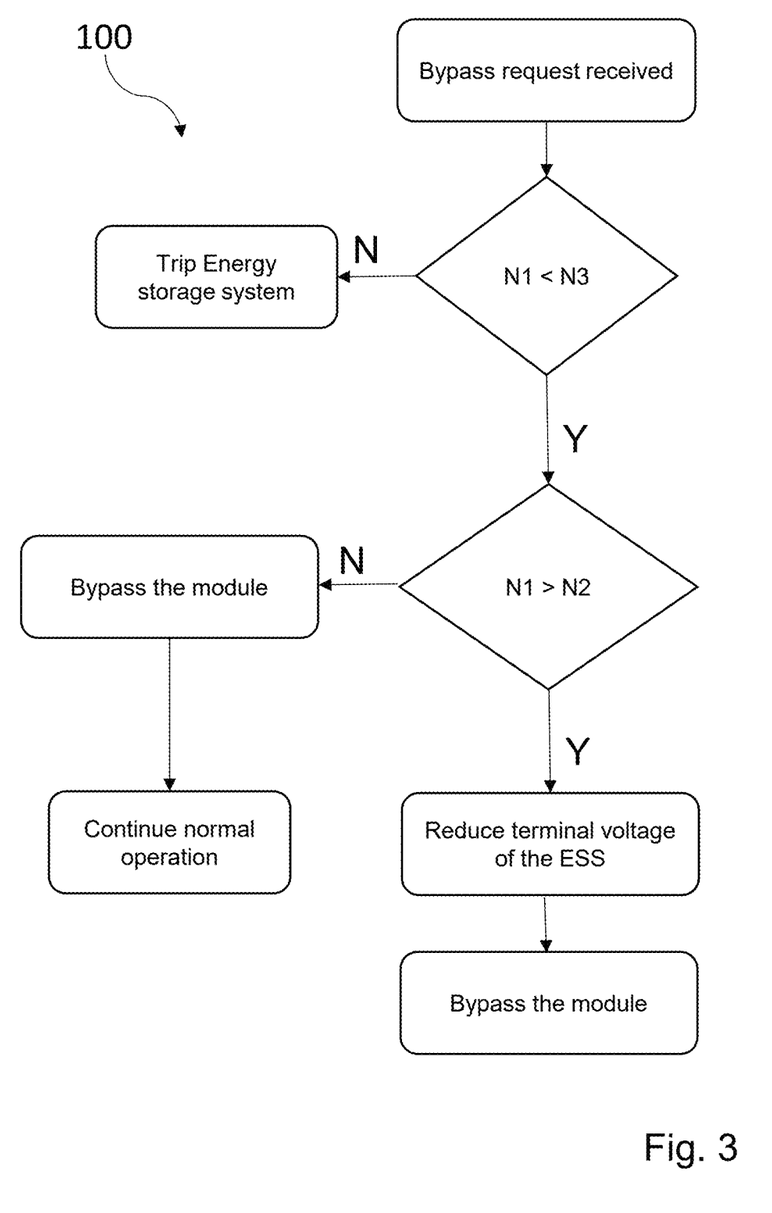
FIG. 3 shows a flow diagram illustrating the method to control a system.

In FIG. 3 a flow diagram of the method 100 is schematically illustrated. The described method 100 can be used in the exemplifying embodiments in FIGS. 1 and 2, and also in other configurations of a converter and ESS. Reference numerals from these figures are also used in the below discussion of FIG. 3 to improve comprehension.

The first step in the illustrated flow scheme is that a failure occurs in at least one of the modules 22 and the local controller 24 associated with that module 22 sends a bypass request to the central controller 30. In other words, the central controller 30 receives a bypass request from the local controller 24 of the faulty module. The bypass request may be for more than one module 22 and the central controller 30 may sum the number of modules that already been bypassed when the request is received with the number of modules that are requested to be bypassed. This results in a total number of modules to be bypassed N1.

The total number of modules to be bypassed N1 is compared to a predetermined number of modules N3. If the total number of modules to be bypassed N1 exceeds the predetermined number of modules N3, the full ESS 20 is tripped and taken out of operation.

The predetermined number of modules N3 is a threshold where the operation of the is not able to fulfil the set requirements on the system. This may for example be a safety threshold or some kind of capability threshold defining how many modules that can be bypassed without providing too low level of grid support. The predetermined number of modules can be seen as a sum of the number of redundant modules and the difference between the number of modules during normal operation and the lowest number of modules the system 1 is allowed to operate with. In other words, how many modules that can be bypassed in one string before the operation of the entire ESS is at risk.

If the total number of modules to be bypassed N1 does not exceed the predetermined number of modules N3, the total number of modules to be bypassed N1 will be compared to a number of redundant modules N2. The number of redundant modules N2 may be the number of redundant modules installed into the ESS or the number of redundant modules other classified (e.g., in advance or dynamically) as being surplus for operation of the ESS to fulfil the demands placed on the ESS, e.g., by the converter.

If the total number of modules to be bypassed N1 is lower than the number of redundant modules N2, the module(s) 22 will be bypassed and the ESS 20 can continue normal operation. However, if the total number of modules to be bypassed N1 is higher than the number of redundant modules N2, the stress on the modules would be higher than desired and therefore an operation is enacted to allow continued operation.

To avoid that the stress is higher than desired on the modules, the converter 10 is controlled by the central controller 30 to reduce the terminal voltage of the ESS 20. Reducing the terminal voltage is a way to reduce the output power and energy of the ESS 20.

When the terminal voltage has been reduced, the module 22 requested to be bypassed can be bypassed and operation of the ESS 20 can continue with a reduced terminal voltage.

To avoid that each request to bypass a module result in a reduction of the terminal voltage, the central controller 30 may control the converter 10 to reduce the terminal voltage such that at least one redundant module is achieved. It will be understood that the failure of a module, before bypass, may also result in its effective removal from the string, and hence the preservation of at least one redundant module may prevent the sudden failure of a module from causing a cascading failure or otherwise interrupting the smooth operation of the ESS.

In the occasion where the system 1 where the ESS 20 has a plurality of strings 21a, 21b as described in connection to FIG. 2, the terminal voltage will be adapted to the string 21a with the lowest number of non-bypassed modules. The other strings may be affected by the same terminal voltage. This implements a further control parameter (not shown) for the central controller, the central controller may have an overview of all the strings and may determine which of the strings has the fewest non-bypassed modules.

As the terminal voltage is adapted to the string with lowest number of non-bypassed modules, additional failures in another string may not result in a reduction of output power and energy, i.e., terminal voltage. Failures in the string with the lowest number of non-bypassed modules, or failures resulting in a new string being the string with the lowest number of non-bypassed modules, may result in a reduction of the terminal voltage.

Figure 4:
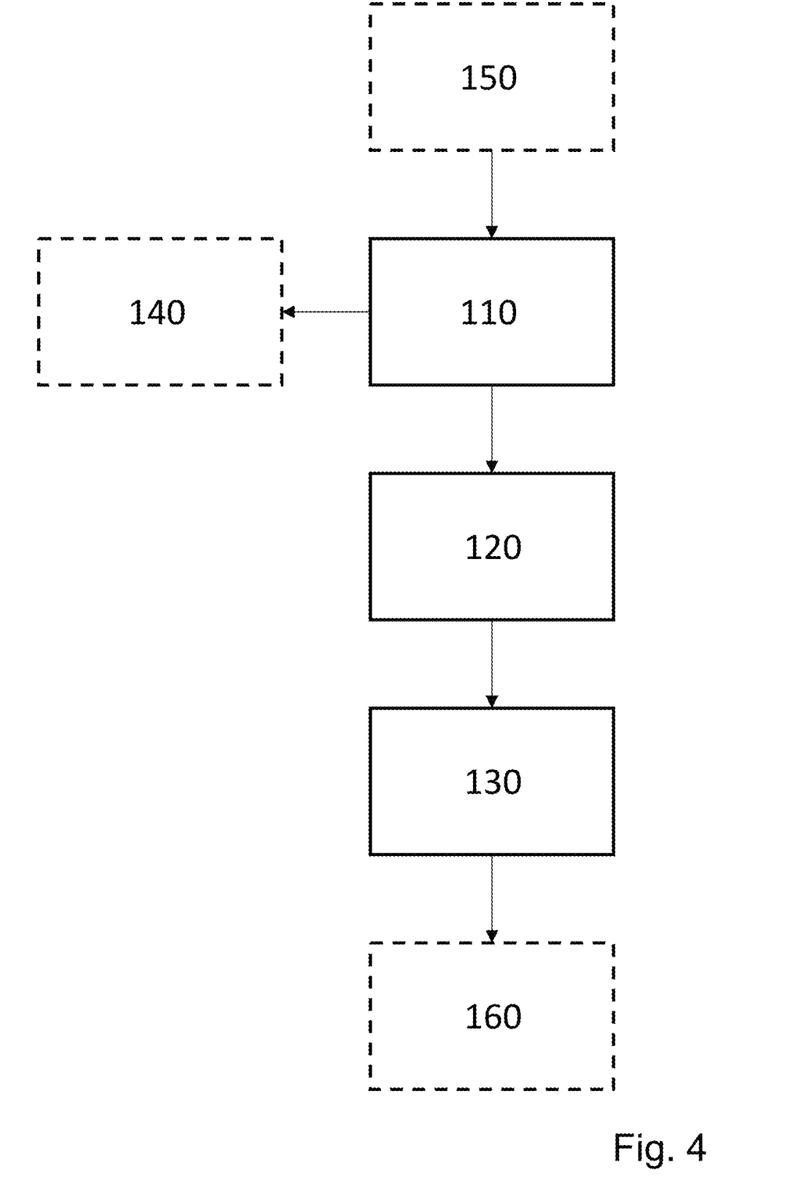
FIG. 4 schematically shows a method to control a system comprising a converter and an energy storage system.

In FIG. 4, a schematic illustration of an example method 100 to control a system 1 comprising a converter 10 and an energy storage system 20 is provided. Reference numerals from previous FIGS. 1 and 2 are used to further aid in comprehension. The method 100 comprises receiving 110 a bypass request to bypass at least one module 22 in the ESS 20.

The method 100 further comprises, based on the total number of modules to be bypassed N1 exceeding the number of redundant modules N2, controlling 120 the converter 10 to reduce the terminal voltage of the ESS 20.

The method 100 further comprises, after reducing the terminal voltage of the ESS 20, bypassing 130 the module 22.

The method 100 further comprises, based on the total number of modules to be bypassed N1 in the string 21 exceeding the predetermined number of modules N3, tripping 140 the ESS 20.

The method 100 further comprises monitoring 150 the modules 22 in the string 21 with at least one local controller 24.

The method 100 further comprises bypassing 160 one or more modules 22 in another string 21b based on the string 21a with the lowest number of non-bypassed modules having more bypassed modules than said other string 21b.

While the present disclosure is susceptible to various modifications and alternative forms, specific examples are shown and described in relation to the drawings, with a view to clearly explaining the various advantageous aspects of the present disclosure. It should be understood, however, that the detailed description herein and the drawings attached hereto are not intended to limit the disclosure to the particular form disclosed. Rather, the intention is to cover all modifications, equivalents, and alternatives falling within the scope of the following claims, including the possible combination of various elements of these specific examples.

The invention claimed is:

1. A method to operate a system comprising an energy storage system (ESS) and a converter, the ESS being connected to the converter such that a direct current (DC)-side of the converter forms DC terminals between which at least one string of modules of the ESS is connected, the ESS comprising a plurality of modules, including at least one redundant module, the method comprising:
   receiving a bypass request to bypass at least one module in the ESS;
   comparing a total number of modules to be bypassed to a number of redundant modules in the ESS;
   based on the total number of modules to be bypassed exceeding the number of redundant modules in the ESS, controlling the converter to reduce the terminal voltage of the ESS while continuing operation of the ESS; and
   after reducing the terminal voltage of the ESS and while the ESS continues to operate with the reduced terminal voltage, bypassing the module.

2. The method according to claim 1, wherein the total number of modules to be bypassed comprises the sum of the number of bypassed modules when the bypass request is received, and the number of modules requested to be bypassed.

3. The method according to claim 1, wherein the module is bypassed based on the total number of modules to be bypassed in the string not exceeding a predetermined number of modules.

4. The method according to claim 3, further comprising:
   based on the total number of modules to be bypassed in the string exceeding the predetermined number of modules, tripping the ESS.

5. The method according to claim 1, wherein the converter is controlled to reduce the terminal voltage by adjusting the modulation scheme of the converter.

6. The method according to claim 1, further comprising:
   monitoring the modules in the string with at least one local controller.

7. The method according to any claim 1, wherein the converter is a modular multilevel converter (MMC).

8. A system comprising:
   a converter having a first and second DC terminal, forming a DC side of the converter,
   an energy storage system (ESS) having at least one string of modules connected between the first and second DC terminal, the at least one string of modules comprising a plurality of modules, including at least one redundant module, and
   a central controller configured to control the system including
      receiving a bypass request to bypass at least one module in the ESS,
      based on a total number of modules to be bypassed exceeding a number of redundant modules in the ESS, controlling the converter to reduce the terminal voltage of the ESS, and
      after reducing the terminal voltage of the ESS, bypassing the module.

9. The system according to claim 8, wherein each string comprises at least one local controller configured to;
   monitor the modules in the string,
   send the bypass request to the central controller, and
   engage a bypass circuit of the module based on a response to the request from the central controller.

10. A method to operate a system comprising an energy storage system (ESS) and a converter, the ESS being connected to the converter such that a direct current (DC)-side of the converter forms DC terminals between which at least one string of modules of the ESS is connected, the ESS comprising a plurality of modules, including at least one redundant module, the method comprising:
    receiving a bypass request to bypass at least one module in the ESS;
    based on a total number of modules to be bypassed exceeding a number of redundant modules in the ESS, controlling the converter to reduce the terminal voltage of the ESS; and
    after reducing the terminal voltage of the ESS, bypassing the module,
    wherein the converter is controlled to reduce the terminal voltage until the string of modules has at least one redundant module.

11. The method according to claim 10, further comprising:
    based on the total number of modules to be bypassed in the string exceeding the predetermined number of modules, tripping the ESS.

12. A method to operate a system comprising an energy storage system (ESS) and a converter, the ESS being connected to the converter such that a direct current (DC)-side of the converter forms DC terminals between which at least one string of modules of the ESS is connected, the ESS comprising a plurality of modules, including at least one redundant module, the method comprising:
    receiving a bypass request to bypass at least one module in the ESS;
    based on a total number of modules to be bypassed exceeding a number of redundant modules in the ESS, controlling the converter to reduce the terminal voltage of the ESS, and after reducing the terminal voltage of the ESS, bypassing the module; and
    based on the total number of modules to be bypassed in the string exceeding the predetermined number of modules, tripping the ESS.

13. A method operate a system comprising an energy storage system (ESS) and a converter, the ESS being connected to the converter such that a direct current (DC)-side of the converter forms DC terminals between which at least one string of modules of the ESS is connected, the ESS comprising a plurality of modules, including at least one redundant module, the method comprising:
    receiving a bypass request to bypass at least one module in the ESS;

based on a total number of modules to be bypassed exceeding a number of redundant modules in the ESS, controlling the converter to reduce the terminal voltage of the ESS; and after reducing the terminal voltage of the ESS, bypassing the module, wherein the ESS comprises a plurality of strings of modules connected in parallel to each other, and wherein the control of the converter to reduce the terminal voltage is based on a string with the lowest number of non-bypassed modules.

14. The method according to claim 13, further comprising:

bypassing one or more modules in another string based on the string with the lowest number of non-bypassed modules having more bypassed modules than said other string.

\* \* \* \* \*